United States Patent [19]
Rickard et al.

[11] Patent Number: 6,016,483
[45] Date of Patent: Jan. 18, 2000

[54] METHOD AND APPARATUS FOR AUTOMATED OPENING OF OPTIONS EXCHANGE

[75] Inventors: John T. Rickard, Durango; William A. Lupien, Hesperus, both of Colo.

[73] Assignee: Optimark Technologies, Inc., Durango, Colo.

[21] Appl. No.: 08/717,387

[22] Filed: Sep. 20, 1996

[51] Int. Cl.[7] .................................................. G06F 157/00
[52] U.S. Cl. ................................. 705/37; 705/35; 705/36
[58] Field of Search .................................. 705/35, 36, 37

[56] References Cited

U.S. PATENT DOCUMENTS

| | | | |
|---|---|---|---|
| 3,573,747 | 4/1971 | Adams et al. | 340/172.5 |
| 3,581,072 | 5/1971 | Nymeyer | 235/152 |

(List continued on next page.)

FOREIGN PATENT DOCUMENTS

| | | |
|---|---|---|
| 2 016 715 | 11/1990 | Canada . |
| 0 401 203 | 12/1990 | European Pat. Off. . |
| 0 411 748 | 6/1991 | European Pat. Off. . |
| 0 434 224 | 6/1991 | European Pat. Off. . |
| 0 512 702 | 11/1992 | European Pat. Off. . |
| 3-68067 | 3/1991 | Japan . |
| 2275796 | 9/1994 | United Kingdom . |
| 2277389 | 10/1994 | United Kingdom . |
| WO96/05563 | 2/1996 | WIPO . |

OTHER PUBLICATIONS

Ackert et al., The Effect of Circuit Breakers on Expected Volatility: Tests Using Implied Volatilities, Atlantic Economic Journal, v25, n2, p117, Jun. 1997.

Robert A. Schwartz: Reshaping the Equity Markets, A Guide for the 1990s, Harper Business, 1991 (month not available), pp. 93–95.

McFarland, Margaret, Deputy Secretary, Division of Market Regulation, SEC Release No. 34–34469; File No. SR–CHX–93–19, "Self Regulatory Organizations, Notice of Amendment Nos. 1, 2, 3 and 4 to Proposed Rule Change by Chicago Stock Exchange, Inc. Relating to the Creation of the Chicago Match System" Federal Register vol. 59, No. 150, Aug. 1994.

Katz, Jonathan G., Secretary, Division of Market Regulation, SEC Release No. 34–33542; File No. SR–CHX–93–19, "Self–Regulatory Organizations; Proposed Rule change by Chicago Stock Exchange, Incorporated Proposing to Establish Rules for an Institutional Trading System, Called the Match Market Exchange Family" Federal Register vol. 59, No. 24, Jan. 1994.

(List continued on next page.)

Primary Examiner—Allen R. MacDonald
Assistant Examiner—Pedro Kanof
Attorney, Agent, or Firm—Kenyon & Kenyon

[57] ABSTRACT

A computer-based system for determining a set of opening prices for a number of series of options traded on an options exchange and for allocating public order imbalances at the opening of trading. Market makers input a current position, a desired target position and market maker orders for options series from market maker terminals. An order entry system receives public orders for options series. A controller determines a set of implied volatilities (prices) for each options series that will maximize a weighted volume of trades across all option series at the opening. Contra orders that can be matched at the opening price are then executed. If there is a residual imbalance of non-executed public orders, the residual imbalance of non-executed public orders is assigned to individual ones of the plurality of market makers so as to minimize a cumulative measure of deviation between the desired target position and the current position of each market maker. The system is applicable to an options exchange, this term including any facility operating an over-the-counter market in options.

36 Claims, 6 Drawing Sheets

U.S. PATENT DOCUMENTS

| | | |
|---|---|---|
| 4,334,270 | 6/1982 | Towers ................................... 364/300 |
| 4,346,442 | 8/1982 | Musmanno . |
| 4,376,978 | 3/1983 | Musmanno ............................. 364/408 |
| 4,412,287 | 10/1983 | Braddock, III ......................... 364/408 |
| 4,566,066 | 1/1986 | Towers . |
| 4,597,046 | 6/1986 | Musmanno et al. .................... 364/408 |
| 4,642,768 | 2/1987 | Roberts . |
| 4,674,044 | 6/1987 | Kalmus et al. ......................... 364/408 |
| 4,677,552 | 6/1987 | Sibley, Jr. .............................. 364/408 |
| 4,677,933 | 7/1987 | Rotella . |
| 4,694,397 | 9/1987 | Grant . |
| 4,722,055 | 1/1988 | Roberts . |
| 4,751,640 | 6/1988 | Lucas . |
| 4,752,877 | 6/1988 | Roberts et al. . |
| 4,774,663 | 9/1988 | Musmanno et al. . |
| 4,799,156 | 1/1989 | Shavit et al. ........................... 364/401 |
| 4,839,804 | 6/1989 | Roberts et al. . |
| 4,876,648 | 10/1989 | Lloyd . |
| 4,903,201 | 2/1990 | Wagner ................................... 364/408 |
| 4,910,676 | 3/1990 | Alldredge . |
| 4,933,842 | 6/1990 | Durbin et al. . |
| 4,953,085 | 8/1990 | Atkins . |
| 4,980,826 | 12/1990 | Wagner ................................... 364/408 |
| 4,992,939 | 2/1991 | Tyler . |
| 5,025,138 | 6/1991 | Cuervo . |
| 5,077,665 | 12/1991 | Silverman et al. ..................... 364/408 |
| 5,083,270 | 1/1992 | Gross et al. . |
| 5,083,782 | 1/1992 | Nilssen . |
| 5,126,936 | 6/1992 | Champion et al. . |
| 5,132,899 | 7/1992 | Fox . |
| 5,136,501 | 8/1992 | Silverman et al. ..................... 364/408 |
| 5,148,365 | 9/1992 | Dembo . |
| 5,161,103 | 11/1992 | Kosaka et al. . |
| 5,168,446 | 12/1992 | Wiseman ................................ 364/408 |
| 5,195,031 | 3/1993 | Ordish .................................... 364/403 |
| 5,214,579 | 5/1993 | Wolfberg et al. . |
| 5,220,500 | 6/1993 | Baird et al. . |
| 5,227,967 | 7/1993 | Bailey .................................... 364/408 |
| 5,243,331 | 9/1993 | McCausland et al. . |
| 5,283,731 | 2/1994 | Lalonde et al. ........................ 364/401 |
| 5,313,560 | 5/1994 | Maruoka et al. ......................... 705/37 |
| 5,375,055 | 12/1994 | Togher et al. .......................... 364/408 |
| 5,557,517 | 9/1996 | Daughterty, III ....................... 364/408 |
| 5,758,097 | 5/1998 | Debe et al. .............................. 705/35 |
| 5,774,880 | 6/1998 | Ginsberg ................................. 705/36 |
| 5,799,287 | 8/1998 | Dembo .................................... 705/36 |
| 5,806,050 | 9/1998 | Shin et al. ............................... 705/37 |

OTHER PUBLICATIONS

Colby, Robert L.D., Deputy Director, Division of Market Regulation, Letter from Deputy Director to the Chicago Stock Exchange regarding trading of a new basket product "the Chicago Basket" ("CMX Basket") dated Oct. 1993 and Simon, George T., Letter on behalf of the Chicago Stock Exchange requesting interpretation of and exemptive relief from various provisions of the Securities Exchange Act of 1934 and certain rules promulgated thereunder in connection with the trading on the Exchange of groups of equity securities ("Basket") dated Sep. 1993.

Off–exchange trading chips away at NYSE, dated Dec. 1992 by Ivy Schmerken, Wall Street & Technology, vol. 10, No. 4, p. 42.

"Customer Computer to Instinet Application Layer Specification" version 4.1, published Sep. 11, 1992 by Instinet Corporation.

"Computer Interface Manual" Apr. 6, 1993, published by the Cincinnati Stock Exchange.

"Making Connections In Off–Exchange Trading" by Victor Kulkosky, Wall Street & Technology, vol. 11, No. 5, Oct. 1993.

"Investment Manger's Workstation Screen" by PBMS © 1991, 2PBMS, Inc.

"News Shorts" articles, undated and newspaper not identified.

"Portfolio System for Institutional Trading" adertising brochure by Barra, Jefferies and Company, Inc. undated.

"Automated Execution As Springboard to Growth" by Karen Corcella, Wall Street & Technology, 12 vol. 11, No. 3.

Untitled brochure, National Financial, A Fidelity Investments Company, undated, National Financial Services Corporation.

"DDX, Davidsohn Order Execution System", the Davidsohn Group, copyright 1993 George Davidsohn and Son, Inc.

"Total Electronic Trading", Merrin Financial Inc., Sep. 30, 1993.

"Schwab Rolls Out First On–Line Trading Software for Windows; Makes Managing Investments Easier Than Ever", dated Oct. 4, 1993 PR Newswire Association, Inc.

"Quantex Heads South", dated Sep. 7, 1993, Financial Post Ltd.

"Branch Support: Omaha–Based Kirpatrick Links Five Branches With Own WAN" dated Jul. 16, 1993, Wall Street Network News.

"PC Quote Announces entry Into Interactive TV Market" dated Jun. 25, 1993, Business Wire Inc.

"Smack–dab in the Middle, Three Technologies Form The Basis For Emerging Middleware, And Each Offers A New Wrinkle For Networking Applications" dated Jun. 21, 1993 by Wayne Eckerson, Network World.

"Desktop systems; Painewebber Empowers Brokers" by Church Appleby, dated Apr. 12, 1993, Information Week.

Trading Room Networks: Carroll Mac Picks SDS for Touch Order Entry, Video, dated Mar. 22, 1993, Trading Systems Technology, No. 181 vol. 6, ISSN: 0892–5542.

"Merrill Adds OTC, Mutual Funds to Electronic Order Entry" by Wendy Connett, dated Dec. 21, 1992, Wall Street Letter, vol. XXIV, No. 51; p. 1.

"Merrill Adds Corporate Inventory To Retail Screen System", dated Nov. 30, 1992, BondWeek, vol. XII, No. 48; p. 11.

"Broker Watch: Painewebber to Distribute Quotron Data Via Own Network: Independence is Goal", dated Sep. 22, 1992 Inside Market Data, No. 1, vol. 8; ISSN: 1047–2908.

"Staying in the Middle . . . Brokers are Fighting to Keep Their Role In The Market; Includes Related Article on Crossing Networks" by Ivy Schmerken dated Dec., 1991 Wall Street Computer Review © Information Access Company; © Dealers' Digest Inc., vol. 9.

"Wall Street Brokers, Merrin Financial Form New Electronic Trading Network" dated Jun. 15, 1993, AFX News.

Wall Street's Quiet Revolution; Technology dated Jun. 1992 by Ivy Schmerken, Wall Street & Technology vol. 9; No. 10; p. 25.

"Merrin Financial Introduces the First Automated PC–Based Brokerage Trading System", dated Jul. 20, 1993,. PR Newswire, Financial News.

"The Telephone Game" by Sharen Kindel, dated Oct. 13, 1992, Financial World, Systems User p. 74.

"The Lattice Network" letter by Brandon Becker, Director SEC to Lloyd H. Feller, Esq., Morgan, Lewis & Bockius dated Sep. 9, 1993 SEC Reply 1: Securities and Exchange Commission, Washington, D.C.

"The Lattice Network" letter by Lloyd H. Feller dated Nov. 16, 1992 to Gordon Fuller, Securities and Exchange Commission, Washington, D.C.

"ITG Links Up with AZX, Bridge" dated Sep. 27, 1993, Institutional Invester Inc., Wall Street Letter.

METHOD AND APPARATUS FOR AUTOMATED OPENING OF OPTIONS EXCHANGE

FIELD OF INVENTION

The present invention is directed to a method and apparatus for the automated opening or reopening of an options exchange, and more particularly, to a method and apparatus for opening all option series substantially simultaneously when opening or reopening trading on an options exchange and for optimization of the allocation of public order imbalances to market makers.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

There are presently five equity options exchanges in the United States and approximately fifty exchanges that trade in options throughout the world. Options are traded on a number of financial instruments, such as, for example, stocks, currencies, Treasury instruments, interest rates, market indices, commodities and the like.

When an options exchange opens trading each morning, or reopens trading after a trading halt in the underlying instrument during the trading day, the exchange conducts an opening "rotation" procedure to determine the opening price for each option. The opening rotation may take upwards of 45 minutes, during which time the price of the underlying instrument may change dramatically. Presently, the opening rotation consumes a significant portion of the trading day. Additionally, present methods used by options exchanges to allocate the residual imbalance in public orders to market makers at the opening often results in undesirable and inefficient allocations.

To better explain the problems associated with opening and reopening of trading in an options market, an explanation of options is in order. For the purpose of clarity, this patent will discuss United States exchange-traded equity options. However, it will be appreciated that the discussion herein also applies to (a) options on other financial instruments traded on U.S. and non-U.S. exchanges, and (b) options of all types that are traded on non-U.S. exchanges.

An equity option is a securities contract which conveys to its owner the right, but not the obligation, to buy or sell a particular stock (called the underlying) at a specific price (called the strike price) on or before a given date.

Typically, there are two basic types of options, namely, Put options and Call options. An American-style equity Call option gives its owner the right to buy 100 shares of the underlying stock at the strike price on or before a given date. An American-style equity Put option gives its owner the right to sell 100 shares of the underlying stock at the strike price on or before a given date. (In the United States, one option contract normally equals 100 shares.) For American-style options, the owner of the option can exercise the contract at any time prior to expiration. For European-style options, the option cannot be exercised until the last trading day prior to expiration.

Equity options are generally traded on United States options exchanges at any time a pricing mechanism exists for the underlying instrument, for example, approximately during the normal hours of operation of U.S. securities exchanges.

The expiration for an option contract is typically the Saturday following the third Friday of the expiration month for the particular contract. Thus, the third Friday of the month is the last trading day for all equity options expiring that month. If the owner of the option does not exercise the option prior to expiration, then the option expires thereafter giving no rights to the owner and placing no obligation on the writer. (The writer is the person who assumes, for a Call option, the obligation to sell stock, or for a Put option, the obligation to buy stock.)

Assume that PQR Corp. is a publicly traded stock which also has publicly traded options. A typical option for this stock might be a PQR October 70 Call. A PQR October 70 Call option is a contract giving the owner of the contract the right to buy 100 shares of PQR Corp. stock at $70 per share until the third Saturday in October, if the buyer chooses to exercise that right.

Generally, there are four expiration months available for each equity option. Moreover, often there are three or more strike prices available for each expiration month of each equity option. Thus, for a single stock, there will likely be at least 24 and very possibly many more options traded for a particular underlying. (It is not unusual to have 60 different options available for a single stock.) For example, for PQR Corp. the following Put option series may be traded on an options exchange:

PQR January 70 Put
PQR April 70 Put
PQR July 70 Put
PQR January 75 Put
PQR April 75 Put
PQR July 75 Put
PQR January 80 Put
PQR April 80 Put
PQR July 80 Put
. . .
. . .

There also would be a similar number of call option series. Thus, it will be apparent that for each underlying stock, there could be dozens of option series, each of which would be differently priced. Therefore, for each underlying stock, there are many option series that must be priced when trading on an option exchange opens or reopens.

The following terms are often used by options traders. An option "type" is either a Put or Call. An option "class" consists of option contracts having the same underlying security. An option "series" consists of option contracts of the same class having the same strike price and expiration month. For example, PQR October 60 Calls constitute a series.

A premium is the price an option buyer pays for the right to buy or sell the underlying security. The premium for an option contract is usually quoted on a per share basis, e.g., PQR October 60 Call $5¼—in this example, the premium is $5¼, and so the cost of the option contract would be $525 (i.e., 100 times $5¼).

An option may be "in-the-money," "at-the-money" or "out-of-the-money." A Call option is in-the-money if the underlying stock price is above the strike price, i.e., the owner of the Call option has the right to buy stock at a price which is less than the price the owner would have to pay to buy the shares in the open market. A Put option is in-the-money if the underlying stock price is below the strike price. An option is at-the-money when it has a strike price that is approximately equal to the current market price of the underlying stock. A Call option is out-of-the-money if the underlying stock price is below the strike price. A Put option is out-of-the-money if the underlying stock price is above the strike price.

The intrinsic value of an option contract is the in-the-money portion of the option's premium. The time value of an option contract is the part of an option's total premium that exceeds its intrinsic value—it is the amount the buyer is willing to pay for an option, above its intrinsic value, in the hope that prior to expiration its value will increase because of a favorable change in the price of the underlying. Thus, the premium for an out-of-the-money option consists entirely of time value. Accordingly, the premium for an option contract (the total price of the option) is its intrinsic value plus its time value.

In unusual market conditions, it may happen that the market premium for a deep-in-the-money option is actually lower than its intrinsic value. This condition may result from inadequate liquidity in the underlying security, which induces options market makers to purchase these contracts only at discounted prices with respect to their theoretical values. (This phenomenon has no deleterious impact on the utility of the present invention.)

There are five quantifiable factors that influence an option's price. These factors are:

the underlying security price
the strike price of the option
the time to expiration
the volatility of the underlying security
the current "risk-free" interest rate.

Using these five factors as input to a theoretical option pricing model, such as, for example, the Black-Scholes model or the Cox-Ross-Rubenstein model, one can determine the theoretical fair option value. Option traders use the theoretical option value as a pricing guide. Additionally, given the current market value of an option, one can use a theoretical option pricing model to derive the implied volatility of the underlying.

There are other non-quantifiable factors that influence an option's price, such as:

market participants' estimates of future volatility
estimates of future performance of the underlying stock
supply and demand of the option and of the underlying
depth of market for the option Theoretical option pricing models produce values that reflect an option's sensitivity to changes in one of the five quantifiable factors. These sensitivities are assigned Greek names, such as delta, gamma, theta, rho and vega. Delta is a measure of the rate of change in an option's theoretical value for a one-unit change in the price of the underlying security. Thus, delta is the theoretical amount by which the option price can be expected to change for a small change in the price of the underlying. As such, it provides a local measure of the equivalent position risk of an option position with respect to a position in the underlying security. Delta may be expressed as a percentage, e.g. 63% (or simply "63" with the percentage symbol implied.) Every option contract has its own unique theoretical delta determined by the five quantifiable factors described above.

Gamma is a measure of the rate of change in an option's delta for a one-unit change in the price of the underlying security. Gamma expresses how much the option's delta should theoretically change for a $1 change in the price of the underlying. Gamma is largest when the option is at-the-money. As the underlying stock's price moves away from the option's strike price (in either direction), the gamma of that option will decrease. Gamma provides a local measure of the rate of change of delta with respect to the price of the underlying.

Theta is a measure of the rate of change in an option's theoretical value for a one-unit change in time to the option's expiration date. Vega (also known as kappa) is a measure of the rate of change in an option's theoretical value for a one-unit change in the volatility of the underlying security. Rho is a measure of the rate of change in an option's theoretical value for a one-unit change in the risk-free interest rate.

Delta and gamma are the primary measures used by those who trade in options. For example, if a trader has a portfolio that has a large absolute value of delta and a large absolute value of gamma, the trader would have a big position that is very sensitive to movements in the underlying's price, and thus, the trader would have a high risk exposure.

Volatility is a measure of stock price fluctuation. Mathematically, volatility is the annualized standard deviation of a stock's daily price changes. Implied volatility is the volatility that would cause the theoretical premium value of an option to match a market premium value, given fixed values of the remaining four quantifiable factors.

It will be appreciated that trading in options is a complex matter, particularly in light of the number of different option contracts that are listed on an options exchange, their interrelationships, and their relationship with the underlying stock. Each series will have different premiums, deltas, gammas and public order supply/demand characteristics. Increasing the complexity of the situation is that options can also be traded on stock indices, such as the S&P500 index.

United States options markets are typically conducted using an "open outcry" trading method, by which competing floor brokers, representing public orders, and market makers trading for their own accounts make bids and offers on the trading floor. Typically, trading takes place in a trading pit—a specific location on the trading floor of an exchange designated for the trading of a specific option class. A market maker is an exchange member on the trading floor who buys and sells options for his or her own account and who has the responsibility of making bids and offers and maintaining a fair and orderly market. A floor broker is a trader on an exchange floor who executes trading orders for the public.

At the opening (or reopening) of an options exchange, the exchange conducts an opening rotation procedure to determine the opening price for each option. It will be appreciated that at an opening or reopening, there are a disproportionate number of public buyers and sellers represented in each series at any particular opening price. There are many series to open; presently, the opening price of each is determined in rotation. For each series, taking into account public order supply and demand, marker makers signal their bid and offering prices, which converge to an agreed opening price for that series. All public order trades that can be matched at that price are executed, and there generally will be, at this stage, a residual imbalance of non-matched orders. The opening for all series in an options class may take upwards of 45 minutes, during which time the price of the underlying instrument may change dramatically, resulting in price discrepancies across series.

When opening multiple series of options in a common underlying security, variations in public order bids and offers across the series also will produce discrepancies in opening prices with respect to the theoretical prices that would correspond to a single implied volatility across all series. For example, a large imbalance of buy orders in one particular series might cause it to open at a significantly higher implied volatility than that of other series. Imbalances between public bids and offers at the opening must be rectified by the market makers. Also, as stated above, variations in the price of the underlying security during the time required to cycle through the opening can result in further significant discrepancies in opening prices across the series. For example, if the underlying stock or index price is falling rapidly, a later-opening call that would have been in-the-money at the beginning of the opening rotation might actually be opened at a lower price than an earlier-opening call that was opened at-the-money.

On some exchanges, once a series is opened, it cannot be traded until the end of the opening rotation. Since it takes time to perform the opening rotation, regular trading in a particular series may be delayed for a significant period of time.

Thus, in summary, the present opening method used by option exchanges takes an undue amount of time and results in inconsistencies in pricing between related series.

There are additional problems related to the present opening methods used by options exchanges, such as, for example, the mechanism by which the residual imbalance in public orders is allocated to market makers. The market makers as a group have an obligation to satisfy the residual imbalance in public orders at the opening price. The present method of accomplishing this goal is a round-robin assignment of the residual contracts to each market maker. This method of assignment often results in undesirable and inefficient allocations. For example, one market maker who is short delta might like to be a buyer of options contracts and another market maker who is long may want to increase his long position. Each market maker comes to the opening with his or her own current position and his or her desired target position after the opening. No attempt is made to meet these desires in the allocation of public order residual balances. As each market maker has unique desires, the present round-robin allocation of the residual balance in public orders may not improve, and could possibly worsen, the actual position of each market maker with respect to their desired position.

Accordingly, an opening method for trading on an options exchange is needed that enables the simultaneous opening of an options market and that takes into account public order supply and demand and the consistency in pricing between various series. Most desirably, an opening method is needed that simultaneously determines an opening price for all series, where the opening price arrived at is a reasonable compromise between (a) having the opening price consistent across all series with respect to implied volatility and (b) having an opening price that caters to the variations in public order supply and demand. Further, there is a need for a method of allocation of residual public order imbalances amongst market makers at the opening that optimizes each market marker's position with respect to his or her desired position.

SUMMARY OF THE INVENTION

The present invention is a computer-implemented method and system that provides an automated simultaneous opening of trading on an options exchange. The present invention permits flexibility in the degree to which public order supply and demand imbalances across a series impose variations in opening implied volatilities, while at the same time providing for optimal assignment of market makers to offset the residual imbalances.

As used herein, the term "opening" also includes "reopening." Accordingly, the present invention can be used to reopen trading on an options exchange after it halts trading during the trading day. The present invention can also be used to facilitate trading when a customer requests a call market in one or more option series, i.e., a demand call.

The present invention determines the opening prices for each option series so that all option series can be opened simultaneously on the option exchange.

The present invention allows all option series to be opened simultaneously at a price that:

I. corresponds reasonably well to a single value of implied volatility (or in the more general case, to a linked set of implied volatilities that correspond to a predetermined implied volatility skew vs. strike price relationship);

II. optimizes volume (or weighted measures of volume) across all series; and

III. enables options market makers to balance the variations in supply and demand of public orders in each series at prices that provide an incentive to the market makers.

The first feature (I) avoids gross inconsistencies in implied volatility at the opening, while still allowing some latitude for variations in market demand. The second feature (II) meets the general purpose of an option exchange, i.e., to maximize the mutual satisfaction among all participants to the greatest degree possible.

The third feature (III) provides an improvement over current methods for the assignment of market makers to the required positions in the opening. Each market maker comes to the opening with his or her own current position (as specified by delta and gamma) and his or her desired target position after the opening (as specified by delta and gamma). The desired target position may be dependent upon the absolute and relative values of implied volatilities determined at the opening. These current and target positions impact the market maker's preferences on participation in the rectification of imbalances in public orders among the different series. Thus, according to the principles of the present invention, the assignment of public orders can be optimized across all market makers.

The present invention proceeds in two stages. At the first stage, the present invention determines a reasonably consistent set of implied volatilities that will maximize a weighted volume of trades across all series at the opening. At the completion of the first stage, there generally will be a residual imbalance in the public orders in each series that do not match off between buyers and sellers. These residual imbalances among public orders are required to be offset by assigning contra positions to the market makers. Accordingly, at the second stage, the present invention assigns residual public orders to market makers so as to minimize a cumulative measure of deviation between the post-opening desired target positions and the actual positions of each market maker at the conclusion of the first stage.

In the representative embodiment of the present invention, the first stage can be formulated as an optimization problem. At one extreme, there is the optimum implied volatility that can be determined so that there is absolute consistency in implied volatility across all series. At the other extreme, there is the optimum volatility of each individual series that can be determined to satisfy market supply and demand. The present invention computes a set of opening implied volatilities that set a reasonable compromise between these extremes. From these implied volatility value(s), the corresponding price is determined for each option series. The present invention also enables an exchange (or other entity) to determine the compromise point between these two positions. Alternatively, this compromise point can be market driven at the opening by a number of predetermined variables and/or be required to fall within specified bounds.

It will be appreciated that, with the appropriate computer hardware and software, the opening volatilities and price for all series can be determined substantially simultaneously.

The opening prices and corresponding volatilities, once determined by the present invention, can be output to market makers (and, if seen as desirable, to other interested parties) so as to assist market makers to determine their post-opening desired target position.

In the representative embodiment of the present invention, the second stage can be regarded as a subsequent optimization problem that minimizes a cumulative measure of deviation between post-opening desired target and actual positions of market makers, subject to the constraint that all public order imbalances across the series must be offset. This second optimization problem can be solved according to the present invention as a quadratic integer programming problem with linear equality constraints.

At the second stage, each market maker supplies as input his or her current delta and gamma positions prior to the opening and his or her desired delta and gamma positions after the opening. (If required, other measures, such as theta, rho and vega, also could be included as target variables.) Public orders are allocated to market makers according to the solution to this second optimization problem.

The first and the second stage are independent and either could be implemented without the other. For example, an options exchange may implement only the first stage to determine the opening price for each option but decide to allocate residual public order imbalances using the present robin-robin assignment of the residual contracts to each market maker. Alternatively, an options exchange may implement only the second stage, using the present opening rotation procedure to determine the opening price for each option but utilizing the present invention to allocate residual public order imbalances to market makers. By extension, the present invention also can be used to effect trading in periodic or event driven call market structures (the later not to be confused with call option types).

It also will be appreciated that the principles of the present invention can be used to open trading on any market where there are multiple instruments that each derive their value from an underlying instrument. For example, the present invention could be adapted for use in the opening of trading on a futures market. The present invention could also be adapted for use in the bond market (with interest rates taking the place of implied volatilities.)

Thus, as used herein, the term "option" includes, where appropriate, futures, bonds and instruments that derive their value from an underlying instrument or parameter.

DETAILED DESCRIPTION

Figure 1:
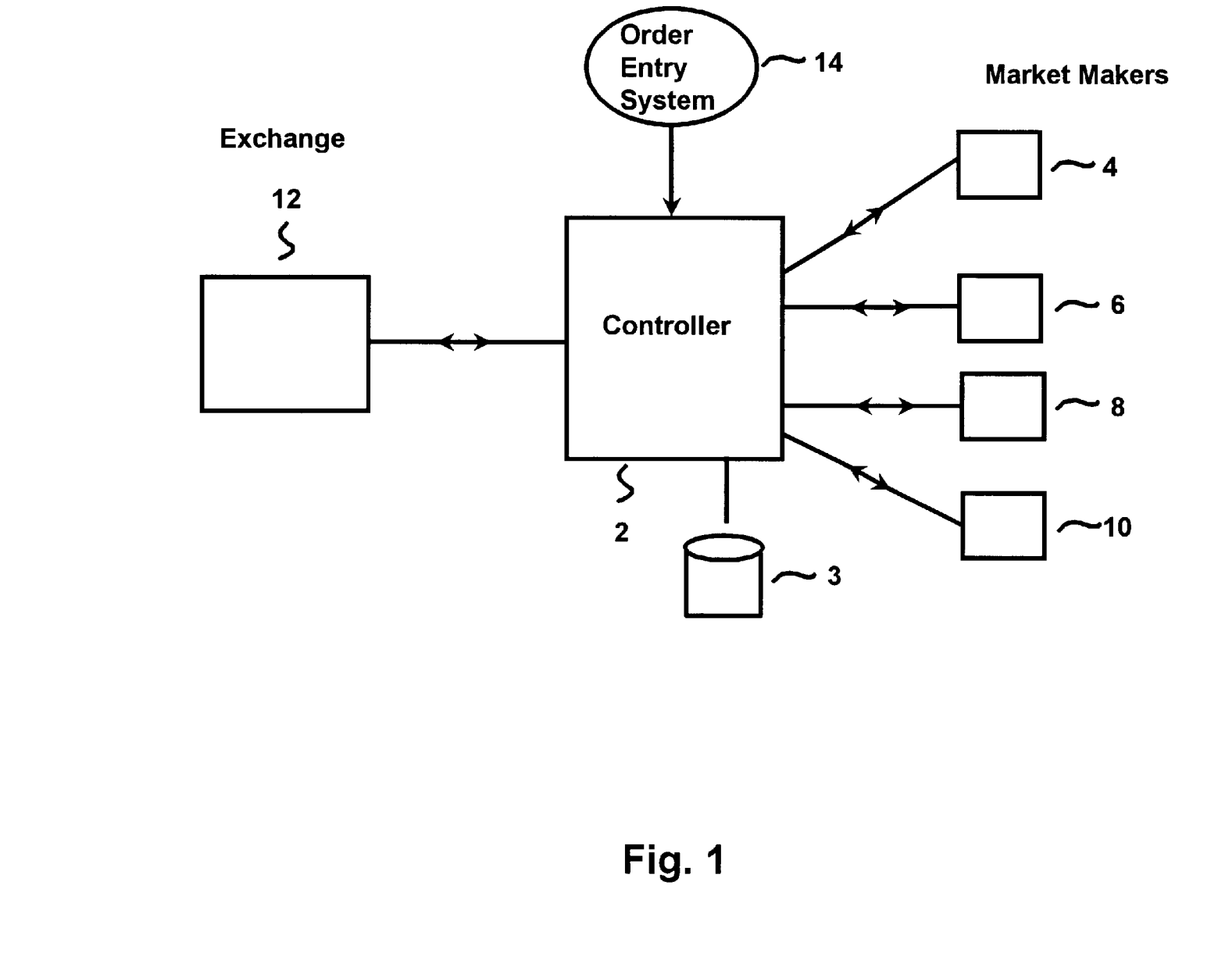
FIG. 1 is a block diagram of the overall system of the present invention.

Referring now to the drawings, and initially FIG. 1, there is illustrated a block diagram of an overall architecture according to a representative embodiment of the present invention. A central controller 2 controls the opening and allocation process of the present invention. Coupled to the controller 2 are a number of market maker terminals 4–10 that can be used to provide information to and receive information from the controller 2. Also coupled to the controller 2 are one or more input/output devices 12 that can be used by an exchange to provide information to, control the operation of and receive information from the controller 2.

Information about public orders can be input to the controller 2 from an order entry system 14. The order entry system 14 can comprise regular options order entry terminals or, for example, the order entry terminals as described in PCT Application No. PCT/US96/07265, filed Apr. 26, 1996 titled "Crossing Network Utilizing Satisfaction Density Profile With Price Discovery Features" which is expressly incorporated in full herein by reference.

At the market maker terminals 4–10, market makers can input their orders, their current position, i.e., their position at the conclusion of the first stage, and their desired target position, i.e., the position they desire to be in after the opening. The current position and desired target position can be input in the form of deltas and gammas.

At the first stage, the controller 2 determines a set of implied volatilities that will maximize a weighted volume of offsetting public orders at the opening across all option series.

After determining the set of implied volatilities, the controller 2, at the second stage, utilizing the current position and the desired target position of each of the market makers, assigns any residual public orders to individual market makers so as to minimize a cumulative measure of deviation between the desired target position and the actual position of each market maker after this assignment.

For exchanges with large volumes, the controller 2 is preferably a computer that can perform calculations at rates of multiple gigaflops, such as, for example with present technology, an IBM RS6000/SP computer. A storage device 3 is coupled to the controller 2. The storage device 3 can comprise a database for storing information received from the market makers and for storing the results of processing by the controller 2. Information received from the market makers can be received in the form of files, and stored as such in the storage device 3.

Typically, each market maker on the exchange will have access to a market maker terminal, such as one of 4–10. The market maker terminals 4–10 can be high powered personal computers or workstations or hand held wireless entry terminals. The market maker terminals 4–10 can communicate with the controller 2. For example, market maker terminals may be coupled to the controller 2 over a local area network (LAN), a wide area network (WAN), via wireless communication protocols or over the Internet. Each market maker terminal includes one or more input/output devices that allow for the entry of orders and current and desired positions and can display output, such as opening volatilities and public orders assigned to the market makers.

According to the present invention, the controller 2 solves two optimization problems. For purposes of explanation, the operation of the present invention can be considered in two stages, each involving a different optimization problem.

Figure 2:
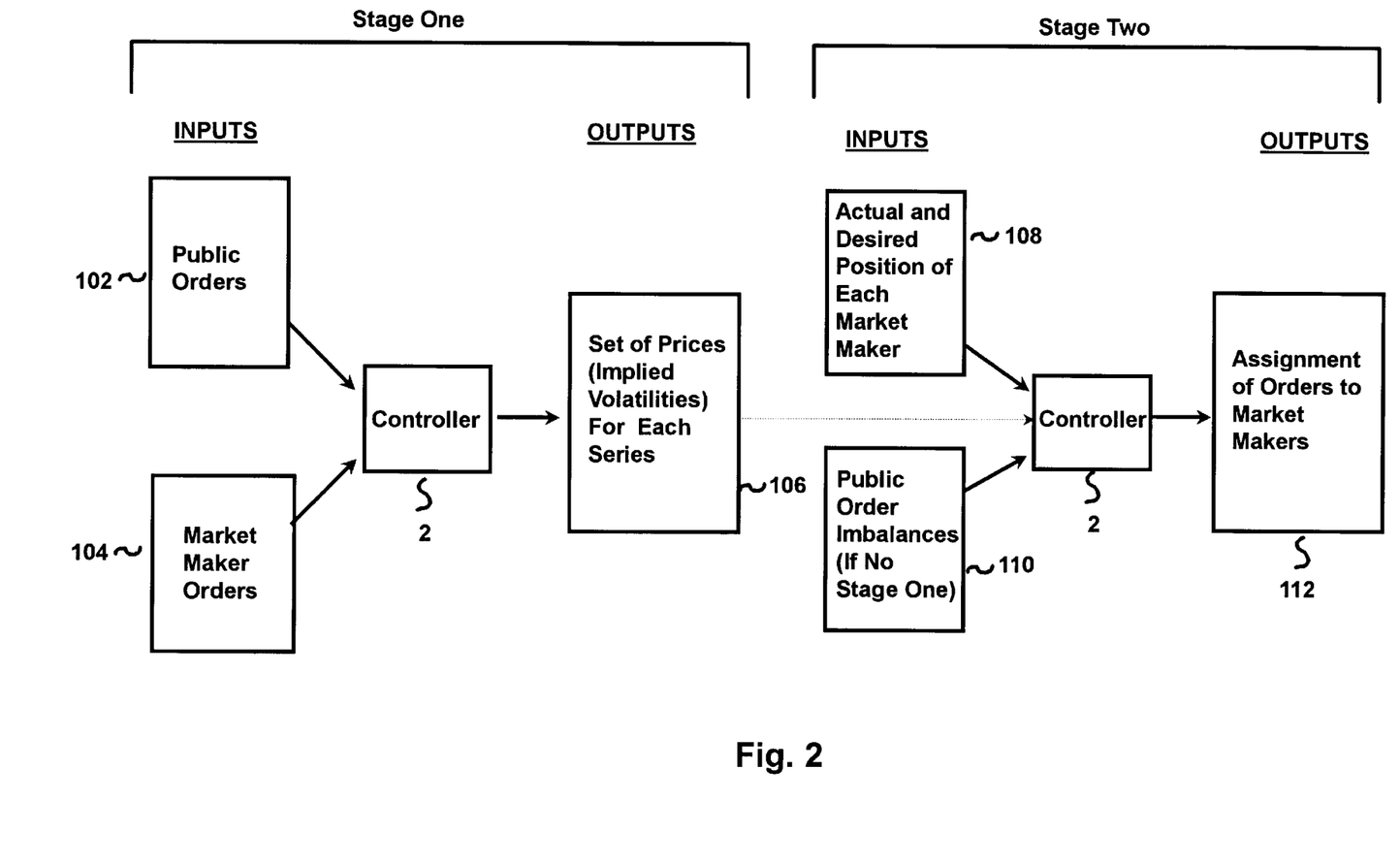
FIG. 2 summarizes the inputs and outputs of the present invention.

FIG. 2 summarizes the inputs and outputs of each stage of the present invention. In stage one, public orders (102) are input to the controller 2 via the order entry system 14 and market maker orders (104) are input to the controller 2 via market maker terminals (4–10). The output of the first stage is a set of prices (implied volatilities) for each series (106). All trades that can occur at that price are executed, and there generally will be, at this stage, a residual imbalance of non-matched orders. In stage two, each market maker inputs via the market maker terminals (4–10) his or her actual position and desired position (108). This input to the present invention can be in the form of two sets of deltas and gammas from each market maker. (Alternatively, each market maker can input this information as the desired change in delta and gamma.) If stage one was not performed by the present invention, residual public orders (110) also must be input to the controller 2, e.g., via the order entry system 14. The output of the second stage is the assignment of the residual public orders to the market makers (112).

First Stage Optimization

The first stage is to determine a reasonably consistent set of implied volatilities (which may, in general, incorporate a skew in implied volatility versus strike price) that will maximize the mutual satisfaction weighted volume of offsetting public orders across all series at the opening. By "reasonably consistent", it is meant that some variation in implied volatility among individual series is acceptable to accommodate the imbalance in public orders (e.g., a higher implied volatility for buy imbalances and lower implied volatility for sell imbalances).

At one extreme, the present invention could allow each series to open independently, using a single price call that is based solely on supply and demand in each series, without regard to any resulting implied volatility inconsistencies. One method that enables each series to open independently using a single price call is described in PCT Application No. PCT/US96/07265, filed Apr. 26, 1996 titled "Crossing Network Utilizing Satisfaction Density Profile With Price Discovery Features". Using such method, the controller 2 would determine an opening price to maximize mutual satisfaction weighted volume based upon public supply and demand, i.e., determine which implied volatilities will maximize the weighted volume in each series individually. Alternatively, if such a method was not used, an opening price could be determined which maximizes trading volume.

Allowing each series to open individually, using a single price call that is based solely on supply and demand in each series would permit the market makers to offset the public order imbalances at prices most favorable to them (i.e., buying low, selling high), but might result in large implied volatility discrepancies across series and/or lower traded volume.

At the other extreme, the present invention could insist on the absolute consistency of a single implied volatility (or a set of implied volatilities satisfying a prescribed skew in volatility versus strike price), without regard to any corresponding imbalances in public orders. This would eliminate pricing discrepancies in pubic orders among the individual series, but might require the market makers to offset large buy and sell imbalances at prices less favorable to them.

Ideally, the present invention enables control of the operating point between these extremes in order to provide a compromise between these conflicting desires.

To this end, suppose that a prescribed implied volatility skew relationship is known, such that for any given implied volatility corresponding to a particular strike price, the "appropriate" implied volatilities of all other strike prices can computed. This allows consistent prospective opening implied volatilities across the series, against which to measure public order induced deviations. Let $\underline{\sigma}$ be a vector representing one such consistent set of implied volatilities. At the other extreme, let $\underline{\sigma}'$ be the vector of implied volatilities that maximizes the respective weighted volumes traded in each series individually. Let $\lambda_i$ be a parameter such that $0 \leq \lambda_i \leq 1$. For the $i^{th}$ option series, the present invention defines the opening implied volatilities as a function of $\underline{\sigma}$ to be $$\sigma_i = (1-\lambda_i)\sigma_i' + \lambda_i \underline{\sigma}_i \qquad (1)$$

which has the effect of allowing the opening implied volatility to vary from one extreme of maximizing the weighted volume traded in each series individually, to the other extreme of forcing consistency of implied volatility across series, as the parameter $\lambda$ varies from 0 to 1.

This parameter can be set uniformly across all series (e.g., by the options exchange), or can be market-driven by a number of possible variables at the opening. For example, suppose that $\mu$ and $\omega$ are the mean and standard deviation, respectively, of the elements of the vector $\underline{\sigma}'$. Then one could specify $\lambda_i$ by the formula $$\lambda_i = 1 - \tanh\left(a\left|\frac{\sigma_i' - \mu}{\omega}\right|\right), \qquad (2)$$

where $\tanh(x)$ is the hyperbolic tangent function. Since $\lambda_i$ in this equation will tend to zero as $\underline{\sigma}_i'$ deviates significantly from $\mu$, this has the effect in equation (1) of "pushing" the opening implied volatility in the $i^{th}$ option series toward $\underline{\sigma}_i'$ when the latter variable is an outlier among the set of individual series' implied volatilities. (The parameter 'a' in equation (2) controls the rate at which $\lambda_i$ varies between 0 and 1, as a function of the remaining portion of the argument.)

The final step is to determine the (coordinated) value(s) of $\underline{\sigma}_j$ in equation (1) for which the corresponding values of $\sigma_i$ maximize the total weighted volume traded over all option series. For these particular volatility value(s), the corresponding price is determined for each series, and the two nearest trading increments above and below this price are identified. If there exists at both price increments a corresponding residual imbalance of buyers among the public orders, the controller 2 sets as the opening price the higher of the two, and vice versa for the case of a seller imbalance at both prices. If the imbalance switches from buyers to sellers between the two price increments, the controller 2 selects as the opening price the one yielding the higher mutual satisfaction weighted volume in that series. (In the pathological case where there existed no public buy (sell) orders in any series that could be used to establish an opening price, the present invention could select the respective prices just below (above) the minimum (maximum) implied volatility across all series corresponding to a unity satisfaction value among all limit sell (buy) orders.)

Another method of choosing the $\lambda_i$ has the objective of maximizing the profit potential of the market makers in the process of offsetting public order imbalances, perhaps within some limits on the allowable deviation from a consistent set of implied volatilities. The controller 2 determines each set of consistent implied volatilities $\underline{\sigma}$ over the range of possible opening implied volatilities. For each $\underline{\sigma}_j$ in this set, the controller 2 determines the side (buy or sell) of the corresponding public order imbalance in the series. For a buy imbalance, the controller 2 steps upward in price increments from the price $p_j$ corresponding to $\underline{\sigma}_j$, and at each price $p_{j+k}$, computes the product of the remaining buy imbalance times the price deviation $(p_{j+k}-p_j)$, which represents the potential profit available to the market makers by selling at price $p_{j+k}$ and unwinding their short position at price $p_j$. The analogous procedure is followed for sell imbalances, stepping down in price. In each series, the controller 2 finds the price for which this profit potential is maximized, perhaps with an exchange-specified bound on the maximum deviation from $p_j$ to be allowed. The controller 2 then picks the opening prices as the set from the above procedure that maximizes the weighted volume traded across all series. The $\sigma_i$ values corresponding to these prices are then computed.

Once the values of $\sigma_i$ are determined by one of the above procedures, they are substituted into the $\sigma$ arguments in equations (3) through (10) below. At the exchange's option, these opening volatilities could be output to the market makers (or other interested persons) prior to proceeding into the second stage optimization of market maker assignments to public order imbalances. This would give the market makers more information upon which to determine their delta and gamma targets as detailed below.

Second Stage Optimization

After the above step, there generally will be a residual imbalance in the public orders in each series that does not match off between buyers and sellers. According to exchange rules, these residual imbalances among public orders must be offset by assigning the contra positions to the market makers.

The market maker assignment problem at the opening can be formulated as an optimization problem that minimizes a cumulative measure of deviation between the post-opening desired target and actual positions of the market makers, subject to the constraints that all public order imbalances across the series must be offset. To this end, define the following variables:

N number of option series in the underlying security (calls and puts combined)

K number of market makers in the option class $D_i(\sigma)$ size imbalance (in the number of contracts) in public orders for series i at implied volatility $\sigma$ (positive integer for more buyers, negative integer for more sellers)

$x_j(\sigma)$ delta position of $j^{th}$ market maker prior to opening at implied volatility $\sigma$ $\tilde{x}_j(\sigma)$ desired delta position of $j^{th}$ market maker after opening at implied volatility $\sigma$ $y_j(\sigma)$ gamma position of $j^{th}$ market maker prior to opening at implied volatility $\sigma$ $\tilde{y}_j(\sigma)$ desired gamma position of $j^{th}$ market maker after opening at implied volatility $\sigma$ $\Delta_i(\sigma)$ delta value of $i^{th}$ series at implied volatility $\sigma$ $\Gamma_i(\sigma)$ gamma value of $i^{th}$ series at implied volatility $\sigma$ For the $i^{th}$ series, assume the $j^{th}$ market maker changes his position by $m_{ij}$ contracts at the opening assignment (positive if buying, negative if selling). The resulting change in his delta position is given by $$\delta_{ij}=100m_{ij}\cdot\Delta_i(\sigma_i), \quad (3)$$

and the corresponding change in his gamma position is given by $$\gamma_{ij}=100m_{ij}\cdot\Gamma_i(\sigma_i). \quad (4)$$

The net change in the $j^{th}$ market maker's delta position over all series is then $$\sum_{i=1}^{N}\delta_{ij}=\sum_{i=1}^{N}100m_{ij}\cdot\Delta_i(\tilde{\sigma}_i), \quad (5)$$

and the corresponding change in the $j^{th}$ market maker's gamma position over all series is $$\sum_{i=1}^{N}\gamma_{ij}=\sum_{i=1}^{N}100m_{ij}\cdot\Gamma_i(\tilde{\sigma}_i) \quad (6)$$

Let $$\varepsilon_{\Delta j}(\tilde{\sigma}_i)=\tilde{x}_j-\left[x_j+\sum_{i=1}^{N}100m_{ij}\cdot\Delta_j(\tilde{\sigma}_i)\right] \quad (7)$$

be the "error" between the $j^{th}$ market maker's desired delta position after the opening and his actual position were he to change his positions by $m_{ij}$ in each of the respective series. Similarly, let $$\varepsilon_{\Gamma j}(\tilde{\sigma}_i)=\tilde{y}_j-\left[y_j+\sum_{i=1}^{N}100m_{ij}\cdot\Gamma_j(\tilde{\sigma}_i)\right] \quad (8)$$

be the "error" between the $j^{th}$ market maker's desired gamma position after the opening and his actual position were he to change his positions by $m_{ij}$ in each of the respective series.

Assuming there are K market makers, the market maker assignment problem is to find the values of $m_{ij}$ (i=1, . . . ,N; j=1, . . . ,K) that minimize the sum-squared deviation errors of all the market makers $$\sum_{j=1}^{K}[\varepsilon_{\Delta j}(\tilde{\sigma}_i)^2+\varepsilon_{\Gamma j}(\tilde{\sigma}_i)^2], \quad (9)$$

subject to the constraints $$\sum_{j=1}^{K}m_{ij}+D_i(\tilde{\sigma}_i)=0 \quad i=1,\ldots,N, \quad (10)$$

which reflect the requirement that public order imbalances in each series be offset exactly by the market makers. The present invention can be augmented straightforwardly to extend the target variables in (9) to include other Greek parameters associated with options (e.g., theta, rho, vega) and also to extend (10) to include market maker specified inequality constraints on capital commitment.

According to the present invention, this second optimization problem is a quadratic integer programming problem with linear equality constraints. In order to rewrite equations (7)–(10) in matrix notation, we define $$M=[M_{ij}]=\begin{bmatrix} M_{11} & \ldots & M_{1K} \\ \ldots & \ldots & \ldots \\ M_{N1} & \ldots & M_{NK} \end{bmatrix} \quad (11)$$

-continued $$M^{(j)} = \begin{bmatrix} M_{1j} \\ \ldots \\ M_{Nj} \end{bmatrix} \quad M_k = [M_{k1} \ldots M_{kK}] \quad (12)$$

$$\Delta = [\Delta_1(\tilde{\sigma}_1) \ldots \Delta_N(\tilde{\sigma}_N)]^T \quad (13)$$

$$\Gamma = [\Gamma_1(\tilde{\sigma}_1) \ldots \Gamma_N(\tilde{\sigma}_N)]^T \quad (14)$$

$$\zeta = [\tilde{x}_1 - x_1 \ldots \tilde{x}_K - x_K]^T \quad (15)$$

$$\xi = [\tilde{y}_1 - y_1 \ldots \tilde{y}_K - y_K]^T \quad (16)$$

$$D = [D_1(\tilde{\sigma}_1) \ldots D_N(\tilde{\sigma}_N)]^T \quad (17)$$

Equations (7) and (8) can be written in matrix notation as $$\epsilon_\Delta = \zeta - 100(\Delta^T M)^T \quad (18)$$

$$\epsilon_\Gamma = \xi - 100(\Gamma^T M)^T \quad (19)$$

The optimization problem then becomes, from (9) and (10), to find $$\min_M (\zeta^T - 100\Delta^T M)(\zeta - 100 M^T \Delta) + (\xi^T - 100\Gamma^T M)(\xi - 100 M^T \Gamma) \quad (20)$$

subject to the constraint $$M1_K = -D, \quad (21)$$

where $1_K$ denotes a K-dimensional column vector, all of whose elements are unity. Adjoining the constraint equation (21) to the objective function (20) using a vector Lagrange multiplier $\lambda$, and then setting the partial derivatives of this expression with respect to $M_k$ (the rows of M) and $\lambda$ to zero, results in the following equations for the optimum $\hat{M}$:

$$-200\Delta_k(\zeta - 100\hat{M}^T\Delta) - 200\Gamma_k(\xi - 100\hat{M}^T\Gamma) + \lambda_k 1_K = 0, \; k=1 \ldots N, \quad (22)$$

$$\hat{M}1_K + D = 0. \quad (23)$$

Pre-multiplying (22) with the vector $1_K^T$ and employing (23), results in $$\lambda = \frac{200}{K}[(1_K^T\zeta + 100\Delta^T D)\Delta + (1_K^T\xi + 100\Gamma^T D)\Gamma]. \quad (24)$$

Substituting this expression into (22) yields the following matrix equation for $\hat{M}$:

$$X^T \hat{M} = Y^T, \quad (25)$$

where $$X = \Delta\Delta^T + \Gamma\Gamma^T, \quad (26)$$

$$Y = \frac{1}{100}\left\{\left[\zeta - \frac{1}{K}(1_K^T\zeta + 100\Delta^T D)1_K\right]\Delta^T + \left[\xi - \frac{1}{K}(1_K^T\xi + 100\Delta^T\Gamma)1_K\right]\Gamma^T\right\} \quad (27)$$

Note that both $X^T$ and $Y^T$ are rank 2 matrices whose columns are linear combinations of the vectors $\Delta$ and $\Gamma$. Thus $X^T$ and the augmented matrix $[X^T:Y^T]$ have the same rank (=2) and therefore a solution of (25) exists.

This solution may be expressed in the form $$\hat{M} = \tilde{M} + V, \quad (28)$$

where $\tilde{M}$ is a rank 2 matrix whose columns are linear combinations of the vectors $\Delta$ and $\Gamma$, and V is a matrix whose columns are orthogonal to $\Delta$ and $\Gamma$. Thus $\tilde{M}$ can be written as $$\tilde{M} = [\Delta:\Gamma]A, \quad (29)$$

where A is a 2×K matrix representing the coefficients of the linear combinations of $\Delta$ and $\Gamma$ embodied in the columns of $\tilde{M}$. From (26) and (29), we have $$X^T \tilde{M} = (\Delta\Delta^T + \Gamma\Gamma^T)[\Delta:\Gamma]A \quad (30)$$

$$= [|\Delta|^2 \Delta + (\Delta^T\Gamma)\Gamma : (\Delta^T\Gamma)\Delta + |\Gamma|^2\Gamma]A$$

$$= [(A_{1j}|\Delta|^2 + A_{2j}\Delta^T\Gamma)\Delta + (A_{1j}\Delta^T\Gamma + A_{2j}|\Gamma|^2)\Gamma]_j$$

where the term within the brackets above represents the $j^{th}$ column of an N×K matrix. Using (25), and equating coefficients of $\Delta$ and $\Gamma$ between (27) and (30), we obtain $$\begin{bmatrix} |\Delta|^2 & \Delta^T\Gamma \\ \Delta^T\Gamma & |\Gamma|^2 \end{bmatrix} A = \frac{1}{100}\begin{bmatrix} \zeta^T - \frac{1}{K}(1_K^T\zeta + 100\Delta^T D)1_K^T \\ \xi^T - \frac{1}{K}(1_K^T\xi + 100\Gamma^T D)1_K^T \end{bmatrix}, \quad (31)$$

$$A = B^{-1}Z \quad (32)$$

where $$B = \begin{bmatrix} |\Delta|^2 & \Delta^T\Gamma \\ \Delta^T\Gamma & |\Gamma|^2 \end{bmatrix}, \quad (33)$$

and $$Z = \frac{1}{100}\begin{bmatrix} \zeta^T - \frac{1}{K}(1_K^T\zeta + 100\Delta^T D)1_K^T \\ \xi^T - \frac{1}{K}(1_K^T\xi + 100\Gamma^T D)1_K^T \end{bmatrix}.$$

Thus, from (29) and (32), we can write $$\tilde{M} = [\Delta:\Gamma]B^{-1}Z. \quad (34)$$

From (23) and (28), we have $$(\tilde{M}+V)1_K = -D, \quad (35)$$

thus showing, after some algebra, that $$\tilde{M}1_K = CD, \quad (36)$$

where C is an N×N rank 2 matrix given by $$C = \frac{1}{|B|}\{\Delta[|\Gamma|^2\Delta^T - (\Delta^T\Gamma)\Gamma^T] + \Gamma[|\Delta|^2\Gamma^T - (\Delta^T\Gamma)\Delta^T]\}. \quad (37)$$

Therefore, from (35) and (36), we have the following constraint equation for V:

$$V1_K = -(I_N + C)D, \quad (38)$$

where $I_N$ is the N-dimensional identity matrix, along with the orthogonality constraints implicit in the definition of V:

$$\Delta^T V = 0,$$

$$\Gamma^T V = 0. \quad (39)$$

Determining the minimum-norm solution $\hat{V}$ is equivalent to finding the solution to the optimization problem $$\min_{V} \text{trace}(V^T V), \tag{40}$$

subject to the constraints in (38) and (39). Again using the technique of Lagrange multipliers results in the following set of equations satisfied by the optimum:

$$2\hat{V}+\theta 1_K^T+\Delta\mu^T+\Gamma\eta^T=0,$$

$$\hat{V}1_K+(I_N C)D=0,$$

$$\Delta^T\hat{V}=0,$$

$$\Gamma^T\hat{V}=0. \tag{42}$$

Since the latter two equations require the columns of $\hat{V}$ to be orthogonal to both $\Delta$ and $\Gamma$, the term in the first equation involving $\theta$ must exactly cancel the two terms involving $\mu$ and $\eta$, and thus we have $$2\hat{V}+\theta'1_K^T=0, \tag{42}$$

where $\theta'$ is orthogonal to $\Delta$ and $\Gamma$.

Postmultiplying by $1_K$ and using the second equation yields $$\theta' = \frac{2}{K}(I_N + C)D. \tag{43}$$

Therefore $$\hat{V} = -\frac{1}{K}(I_N + C)D1_K^T. \tag{44}$$

Hence, combining (28), (34) and (44), results in a closed-form optimal solution for the assignments of offsetting contracts to each market maker in order to rectify the imbalances in public orders:

$$\hat{M} = [\Delta:\Gamma]B^{-1}Z - \frac{1}{K}(I_N + C)D1_K^T. \tag{45}$$

From (18), (19) and (45), the optimal errors are given by $$\hat{\varepsilon}_\Delta = \frac{1}{K}(1_K^T\zeta + 100\Delta^T D)1_K, \tag{46}$$

$$\hat{\varepsilon}_\Gamma = \frac{1}{K}(1_K^T\xi + 100\Gamma^T D)1_K$$

Note the following implications of these expressions: A) the optimal errors are identical for each market maker, since the error vector is a constant times the unit vector; and B) the optimal error magnitude summed over all market makers represents the sum of all delta (gamma) changes desired by the market makers and the sum of all delta (gamma) changes dictated by the public order imbalances across the option series. Thus, it is possible (although unlikely) that the error could be reduced to zero if the aggregate market maker desire were to offset exactly the aggregate delta (gamma) imbalance in public orders.

In general, this optimum solution will not result in integer values of the elements of the $\hat{M}$ matrix, and thus the optimization is completed by finding the nearest integer point in NK-dimensional space, lying in the subspace defined by the intersection of the N linear manifolds specified by equation (21), that results in minimum squared error as given by (20). Rather than using exhaustive or exotic search approaches to this relatively immaterial problem, the controller 2 could find an approximately optimal integer point solution by taking into account the nature of the constraint equations (21), which require that $$\sum_{j=1}^{K} M_{ij} = -D_i(\tilde{\sigma}_i), i = 1 \ldots N, \tag{47}$$

i.e., the row sum of the $i^{th}$ row of the matrix M must equal the integer value $-D_i(\sigma_i)$. A simple procedure that will produce a near-optimal solution can be obtained by rounding up or down the elements of the $j^{th}$ row $\hat{M}_j$ of the matrix $\hat{M}$ to their nearest integer values, and then making adjustments of plus or minus one to the rounding over the row elements as needed to remain compliant with (44). For example, if the row sum of the $i^{th}$ row after the rounding is $-D_i(\sigma_i)+r$, then for $r \geq 1$ the controller 2 identifies the r row elements with the smallest fractional parts that were rounded up, and rounds them down. For $r \leq -1$, the controller 2 performs the reverse procedure, rounding up the r row elements with the largest fractional parts that were rounded down. This will assure that at most a change of $\pm 1$ with respect to the optimum number contracts in a given series will be assigned to any market maker.

EXAMPLES

To illustrate the relative performance of the optimum assignment with respect to the round-robin assignment of public order imbalances to market makers, we consider the following examples. We assume there are ten option series, with 30 market makers. Suppose that the opening values of $\Delta$, $\Gamma$ and D in the ten series are given by the vectors:

$$\Delta = \begin{bmatrix} -0.212 \\ -0.164 \\ 0.205 \\ 0.11 \\ 0.037 \\ 0.309 \\ -0.276 \\ 0.411 \\ 0.739 \\ 0.462 \end{bmatrix} \quad \Gamma = \begin{bmatrix} 0.114 \\ 0.03 \\ 0.085 \\ 0.103 \\ 0.15 \\ 0.034 \\ 0.098 \\ 0.14 \\ 0.03 \\ 0.028 \end{bmatrix} \quad D = \begin{bmatrix} 77 \\ -97 \\ 10 \\ -41 \\ 34 \\ 73 \\ -26 \\ -198 \\ 40 \\ 30 \end{bmatrix}$$

Figure 3A:
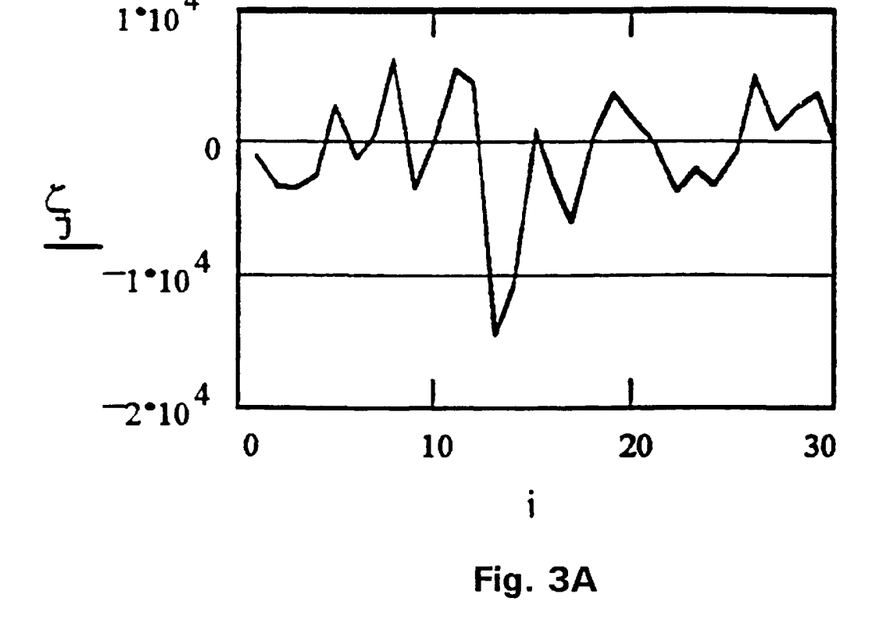
FIGS. 3A and 3B show values relating to example one.
Figure 3B:
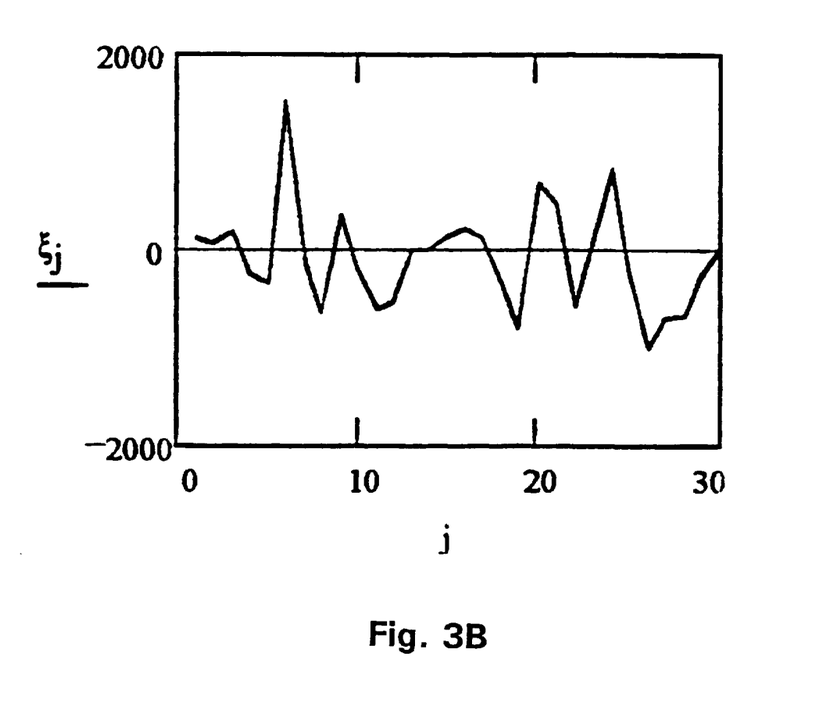

Further assume that the 30 market maker's $\zeta$ and $\xi$ values are as shown in the plots in FIGS. 3A and 3B.

Figure 4A:
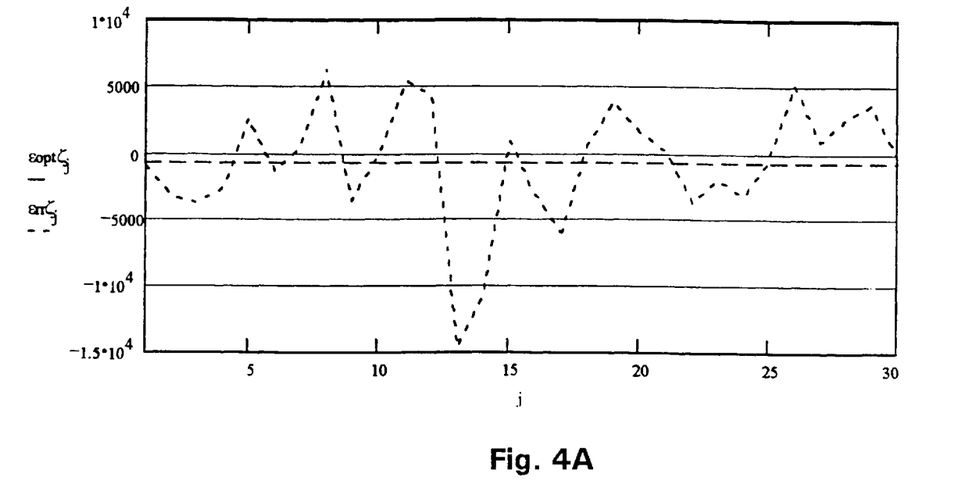
FIGS. 4A and 4B show a plot of the optimum and round-robin assignment errors for example one.
Figure 4B:
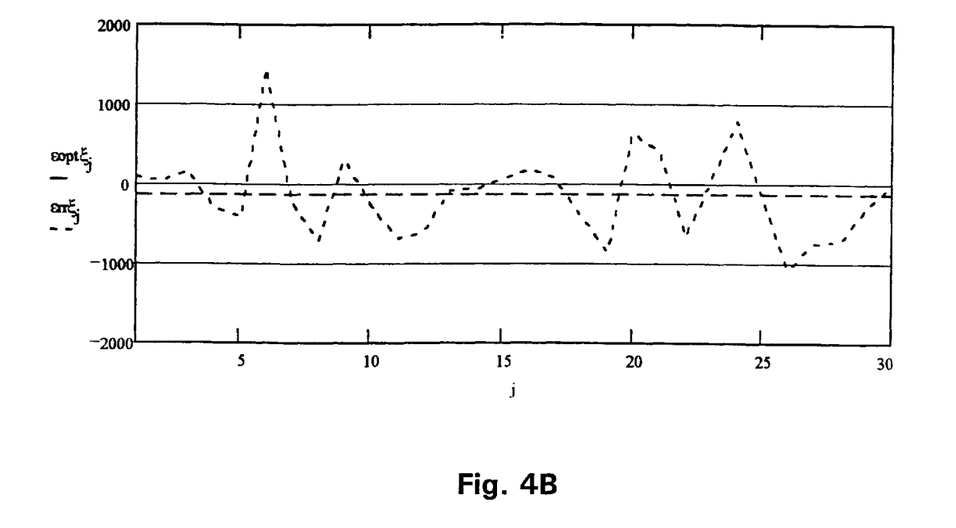

The optimum and round-robin assignment errors for $\zeta$ and $\xi$ are shown in FIGS. 4A and 4B respectively.

The root mean square (rms) error per market maker in $\zeta$ is 721 for the optimum assignment, and 4,529 for the round-robin assignment. The corresponding rms error per market maker in $\xi$ is 135 and 544, respectively.

As a second example, let $\Delta$, $\Gamma$ and D in the 10 option series be given by the vectors:

$$\Delta = \begin{bmatrix} 0.437 \\ 0.458 \\ -0.372 \\ -0.258 \\ -0.269 \\ 0.327 \\ -0.473 \\ 0.692 \\ -0.314 \\ 0.413 \end{bmatrix} \quad \Gamma = \begin{bmatrix} 0.196 \\ 0.059 \\ 0.175 \\ 0.02 \\ 0.029 \\ 0.062 \\ 0.163 \\ 0.163 \\ 0.18 \\ 0.054 \end{bmatrix} \quad D = \begin{bmatrix} 2 \\ -173 \\ 192 \\ 46 \\ -53 \\ 144 \\ -104 \\ -180 \\ -132 \\ -112 \end{bmatrix}$$

Figure 5A:
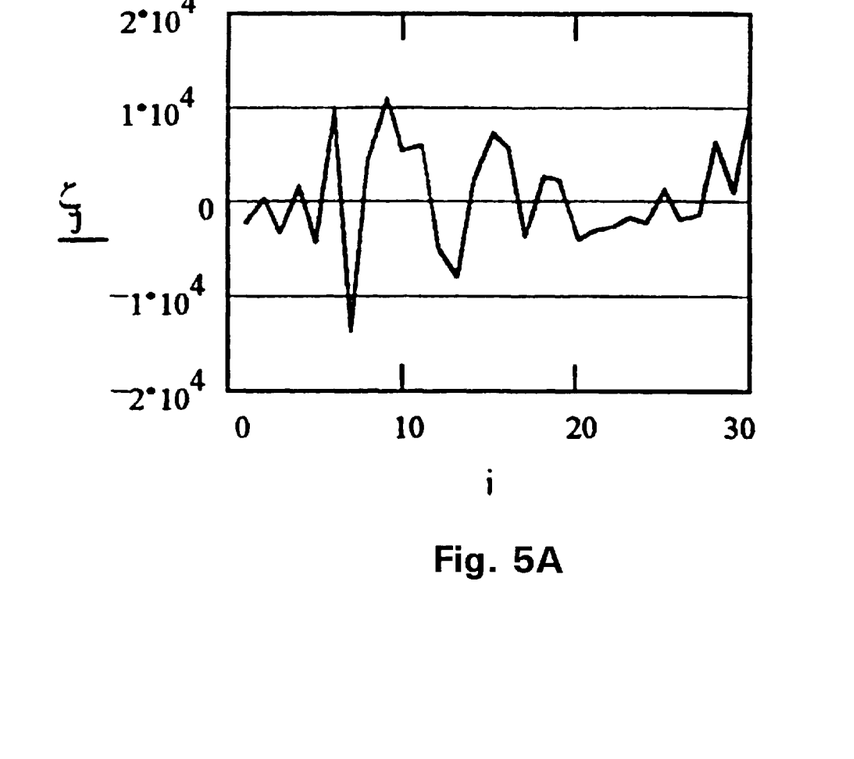
FIGS. 5A and 5B show values relating to example two.
Figure 5B:
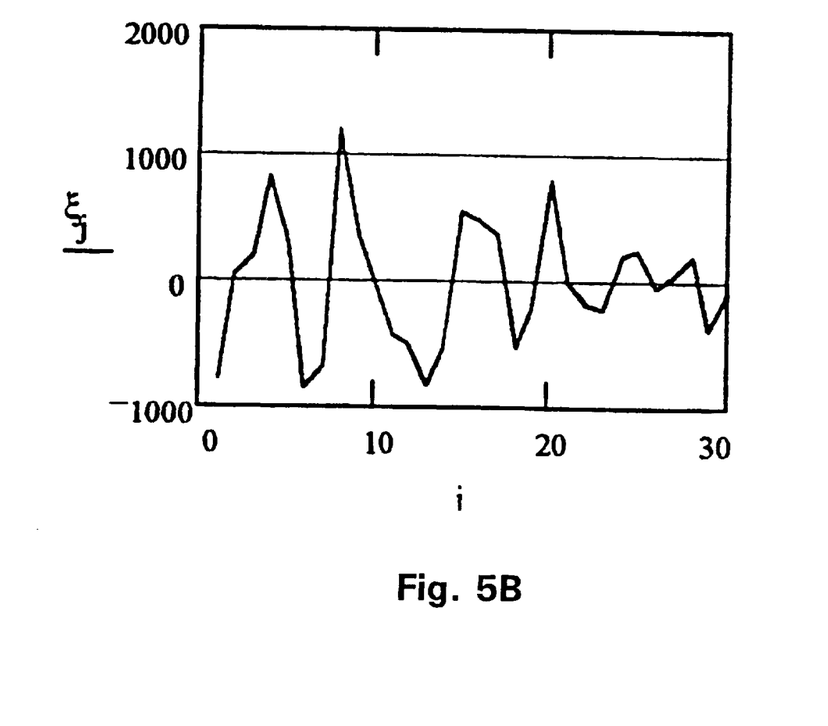
Figure 6A:
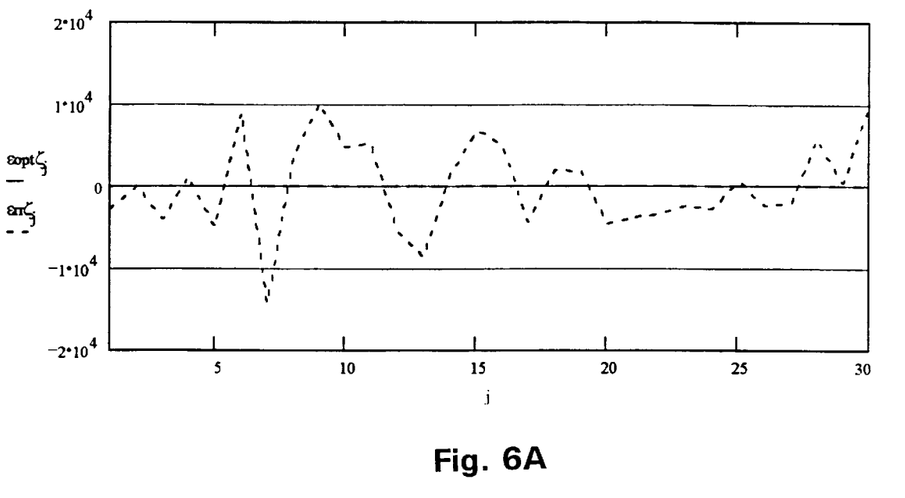
FIGS. 6A and 6B show a plot of the optimum and round-robin assignment errors for example two.
Figure 6B:
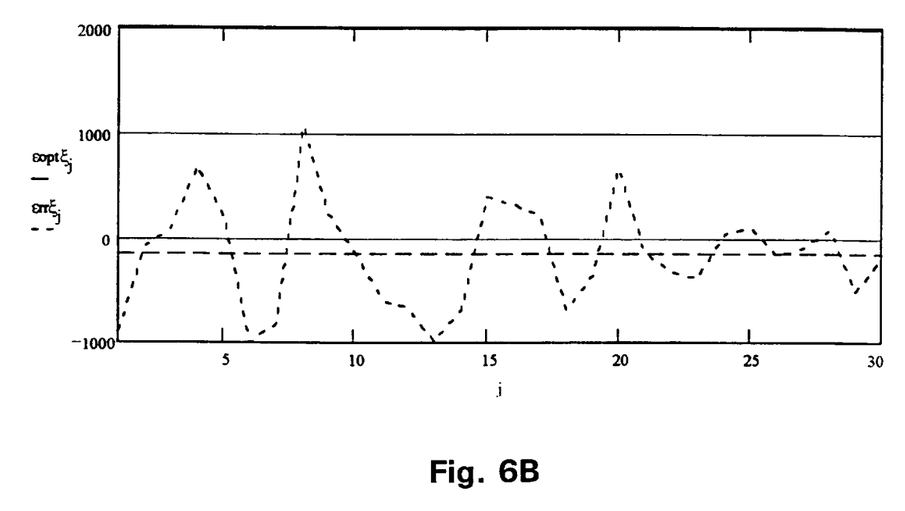

Further assume that the 30 market maker's $\zeta$ and $\xi$ values are as shown in the plots in FIGS. 5A and 5B respectively. The optimum and round-robin assignment errors for $\zeta$ and $\xi$ are shown in FIGS. 6A and 6B respectively. The rms error per market maker in $\zeta$ is 74 for the optimum assignment, and 5,514 for the round-robin assignment. The corresponding rms error per market maker in $\xi$ is 158 and 527, respectively.

These examples demonstrate the substantial improvement in the rms market maker target errors using the optimal assignment method of the present invention versus the prior art round-robin assignment method.

The controller 2 of the representative embodiment of the present invention can be implemented utilizing a logic circuit or a computer memory comprising encoded computer-readable instructions, such as a computer program. The functionality of the logic circuit or computer memory is described in detail above.

Generally, the present invention has practical application as it enables options markets to open essentially instantaneously and it efficiently allocates residual public orders to market makers. It should be appreciated that the solution posed by the present invention could not be manually accomplished by a human. According to the present invention, input can be received from many market maker terminals (that may be located in a multitude of various locations), and this input is electronically transmitted and stored in a central location for processing. No human could possibly perform the communications, calculations and optimizations required to concurrently determine the implied volatilities for each of the many series of options and the efficient assignment of residual public orders.

What is claimed is:

1. A computer-based system for opening trading in options, comprising:
    a plurality of input devices to receive from each one of a plurality of market makers a current position, a desired target position and market maker orders for options series;
    an order entry system for receiving public orders for options series; and
    a controller, coupled to the plurality of input devices and the order entry system, the controller comprising
        (a) means for determining a set of prices for each options series that will maximize a weighted volume of trades across all option series at the opening,
        (b) means for executing all orders that can occur at the set of prices,
        (c) means for determining a residual imbalance of non-executed public orders, and p2 (d) means, utilizing the current position and the desired target position of each one of the plurality of market makers, for assigning the residual imbalance of non-executed public orders to individual ones of the plurality of market makers so as to minimize a cumulative measure of deviation between the desired target position and the current position of each market maker.

2. The system of claim 1 wherein the set of prices comprises a set of implied volatilities.

3. The system of claim 1 wherein the set of prices for each option series is simultaneously determined.

4. The system of claim 1 further comprising a plurality of output devices, coupled to the controller, to output the set of prices to the plurality of marker makers.

5. The system of claim 1 wherein means for determining the set of prices further comprises means for determining a set of opening volatilities for each series that is a reasonable compromise, according to a predetermined parameter, between consistency in pricing across each series and public order demand across each series.

6. The system of claim 5 wherein the parameter is set by an options exchange.

7. The system of claim 5 wherein the parameter is determined on-the-fly at the opening.

8. The system of claim 1 wherein the current position of each one of the plurality of market makers is input as a delta measure and a gamma measure.

9. The system of claim 1 wherein the desired target position of each one of the plurality of market makers is input as a delta measure and a gamma measure.

10. A computer-based system for determining a set of opening prices for a plurality of series of options, comprising:
    a plurality of input devices to receive from each one of a plurality of market makers orders for options series;
    an order entry system for receiving public orders for options series; and
    a controller, coupled to the plurality of input devices and the order entry system, utilizing the market maker orders and public orders to determine a set of prices for each options series that will maximize a weighted volume of trades across all option series at the opening.

11. The system of claim 10 wherein the controller further comprises means for executing all public orders and market maker orders that can occur at the determined set of prices.

12. The system of claim 10 wherein the set of prices for each option series is simultaneously determined.

13. The system of claim 10 further comprising a plurality of output devices, coupled to the controller, to output the set of prices to the plurality of marker makers.

14. The system of claim 10 wherein means for determining the set of prices further comprises means for determining a set of opening volatilities for each series that is a reasonable compromise, according to a predetermined parameter, between consistency in pricing across each series and public order demand across each series.

15. The system of claim 14 wherein the parameter is set by an options exchange.

16. The system of claim 14 wherein the parameter is determined on-the-fly at the opening.

17. A computer-based system for allocating public order imbalances at the opening of trading of in options, comprising:
    a memory storing a plurality of orders for options representing a residual imbalance of public orders in each options series that do not match an opening price corresponding to said options series;
    a plurality of input devices to receive from each one of a plurality of market makers a current position and a desired target position; and a controller, coupled to the memory and the plurality of input devices, utilizing the current position and the desired target position of each one of the plurality of market makers to assign each public order in the residual imbalance of public orders to individual ones of the plurality of market makers so as to minimize a cumulative measure of deviation between the desired target position and the current position of each market maker.

18. The system of claim 17 wherein the current position of each one of the plurality of market makers is input as a delta measure and a gamma measure.

19. The system of claim 17 wherein the desired target position of each one of the plurality of market makers is input as a delta measure and a gamma measure.

20. A computer-implemented method for opening trading in options by a plurality of market makers, comprising:

receiving from each one of a plurality of market makers a current position, a desired target position and market maker orders for options series;

receiving public orders for options series; and determining a set of prices for each options series to maximize a weighted volume of trades across all option series at the opening;

executing all orders that can occur at the set of prices determined in the previous step;

if there is a residual imbalance of non-executed public orders, assigning the residual imbalance of non-executed public orders to individual ones of the plurality of market makers so as to minimize a cumulative measure of deviation between the desired target position and the current position of each market maker.

21. The method of claim 20 wherein the set of prices comprises a set of implied volatilities.

22. The method of claim 20 wherein the set of prices for each option series is simultaneously determined.

23. The method of claim 20 further comprising the step of outputting the determined set of prices.

24. The method of claim 20 wherein the step of determining the set of prices further comprises the step of determining a set of opening volatilities for each series that is a reasonable compromise, according to a compromise parameter, between consistency in pricing across each series and public order demand across each series.

25. The method of claim 24 further comprising the step of setting the compromise parameter in advance by an options exchange.

26. The method of claim 24 further comprising the step of determining the compromise parameter on-the-fly at the opening.

27. The method of claim 20 wherein the step of receiving from each one of a plurality of market makers a current position further comprises receiving from each one of the plurality of market makers a delta measure and a gamma measure corresponding to the current position.

28. The method of claim 20 wherein the step of receiving from each one of a plurality of market makers a desired target position further comprises receiving from each one of the plurality of market makers a delta measure and a gamma measure corresponding to the desired target position.

29. A computer-implemented method for determining a set of opening prices for a plurality of series of traded options, comprising:

receiving orders for options series from a plurality of market makers;

receiving public orders for options series; and determining a set of prices for each options series, wherein the set of prices maximizes a weighted volume of trades across all option series at the opening.

30. The method of claim 29 further comprising the step of executing all possible public orders and market maker orders at the determined set of prices.

31. The method of claim 29 wherein the step of determining a set of prices for each options series further comprises the step of simultaneously determining a set of prices for each options series.

32. The method of claim 29 wherein the step of determining a set of prices for each options series further comprises the steps of:

providing a parameter; and determining a set of opening volatilities for each series that is a reasonable compromise, according to the parameter, between consistency in pricing across each series and public order demand across each series.

33. A computer-implemented method for allocating public order imbalances at the opening of trading in options, comprising:

providing a plurality of orders for options representing a residual imbalance of public orders in each options series that do not match an opening price corresponding to said options series;

receiving from each one of a plurality of market makers a current position and a desired target position; and automatically assigning each public order in the residual imbalance of public orders to individual ones of the plurality of market makers so as to minimize a cumulative measure of deviation between the desired target position and the current position of each market maker.

34. The method of claim 33 wherein the step of receiving from each one of the plurality of market makers a current position further comprises receiving from each one of the plurality of market makers a delta measure and a gamma measure corresponding to the current position.

35. The method of claim 33 wherein the step of receiving from each one of a plurality of market makers a desired target position further comprises receiving from each one of the plurality of market makers a delta measure and a gamma measure corresponding to the desired target position.

36. A computer-implemented method for opening trading in options, comprising:

receiving from each one of a plurality of market makers a current position, a desired target position and market maker orders for options series;

receiving public orders for options series; and concurrently determining a set of opening prices for each options series;

executing all possible public orders and market maker orders at the set of opening prices determined in the previous step;

if there is a residual imbalance of non-executed public orders, optimally assigning the residual imbalance of non-executed public orders to individual ones of the plurality of market makers taking into account the desired target position and the current position of each market maker.

* * * * *